United States Patent [19]

Pittinger, Sr. et al.

[11] 4,138,810
[45] Feb. 13, 1979

[54] TORSIONAL VIBRATION FILAMENT FEED SYSTEM

[76] Inventors: Charles B. Pittinger, Sr., Rte. 1, Box 68, Weatherford, Tex. 76086; Charles B. Pittinger, Jr., 320 Cockeys Mill Rd., Reisterstown, Md. 21136

[21] Appl. No.: 789,205

[22] Filed: Apr. 20, 1977

[51] Int. Cl.² .................. A01D 35/26; A01G 3/06
[52] U.S. Cl. ................................ 30/276; 56/12.7
[58] Field of Search .................. 30/276, 347; 56/12.7, 56/295; 51/335

[56] References Cited

U.S. PATENT DOCUMENTS 2,713,237  7/1955  Monjar ........................ 51/335

Primary Examiner—Jimmy C. Peters
Attorney, Agent, or Firm—John F. McClellan, Sr.

[57] ABSTRACT

An incremental feed system for filament in vegetation-cutting filament trimmers, in which the filament is controlled in unspooling by a gear mechanism which is responsive to cutting-operation-induced torsional vibration relative to the driveshaft to feed fresh filament in amount proportional to the torsional vibration and thus in amount proportional to operational wear of the cutting length. In an embodiment, torsional vibration resulting in feeding filament may be produced by switching the filament trimmer on and off.

10 Claims, 6 Drawing Figures

TORSIONAL VIBRATION FILAMENT FEED SYSTEM

For priority purposes cross-reference is made to a copending application by Charles B. Pittinger, Sr. and Charles B. Pittinger, Jr., the present inventors, Ser. No. 771,426, filed Feb. 24, 1977, for "Incremental Means and Method For Filament-Trimmer Filaments".

This invention relates generally to vegetation cutting filament-trimmer and specifically to means and method for feeding filament to replace worn cutting lengths of filament.

A principal object of this invention is to provide a filament feed responsive to torsional vibration of a component or components relative to the driveshaft for feeding filament in proportion to operational vibrations incident to filament wear, and in embodiment, for feeding filament in proportion to starting and stopping of the filament trimmer by switching it on and off.

Further objects are to provide a filament feed which is safe, reliable, durable and economical to produce, which requires a minimum of skill to operate, and which is applicable to many filament trimmer designs, sizes and drive types.

In the prior art various disclosures have been made. Reference is made to the following: U.S. Pat. No. 3,664,102, granted May 23, 1972 to Walter Reber for Cutter Mechanism For Agricultural Machines Or Lawn Mowers, disclosing filament feed through plural passages in a filament trimmer, and to U.S. Pat. No. 3,928,911 granted Dec. 30, 1975 to Charles B. Pittinger, Jr., for HOLLOW-SHAFT FEED FILAMENT TRIMMER, disclosing pinch type feed control down a hollow shaft; however, none of the above disclosures is believed to make fair suggestion of the present invention, which employs a new approach based on co-acting inertial means and gearing structure and method not found in the referenced old art filament trimmers.

In brief description given for cursory description only and not as limitation, the invention includes a unit employing inertia-generated relative rotary motion between a drive and a filament feed for feeding filament increments.

The above and other objects and advantages of the present invention will become more readily apparent on examination of the following description, including the drawings, in which.

STRUCTURE, FIRST EMBODIMENT

Figure 1:
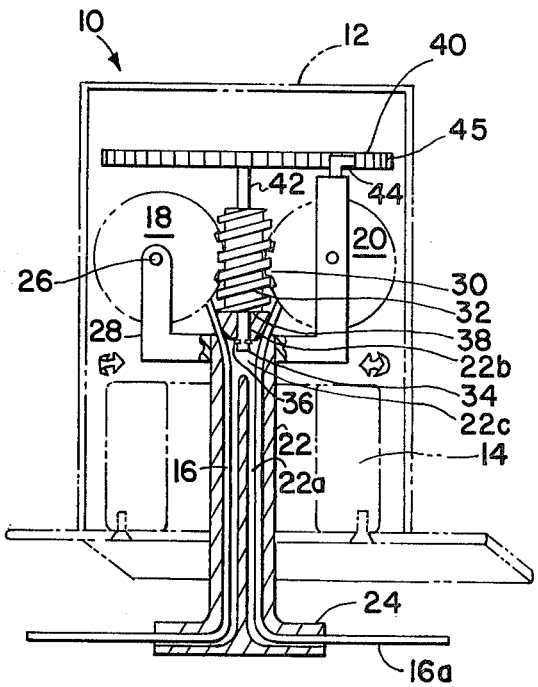
FIG. 1 is a side elevational view, partly in section, diagramming a portion of a filament trimmer embodying this invention.

FIG. 1 shows the invention 10 in a schematically represented filament trimmer housing 12 enclosing a motor 14 and arranged for feeding one or more filaments 16 which are affixed to and extend from over the top of respective spools 18, 20 down a vertical shaft 22 which is driven by the motor, and which preferably has inner filament-channels 22a, and out a cutter head 24. Each spool mounts on a horizontal axle 26 held in a yoke 28 clamped or otherwise affixed to the driveshaft, the spool locations preferably being balanced about the driveshaft axis, with the spool axles parallel to provide uniform action.

Each spool has at least one integrally associated flange 30 or wormwheel, referred to in the claims as the second and third gears.

The gear teeth of the flange perimeters engage a first gear or worm pinion 32 rotatably mounted, as by fit of a downward extension 34 thereof with a coaxial bore 22b in the upper driveshaft. The worm pinion may be retained by any conventional means such as a snap ring 36 retaining a shoulder 38 at the lower end against the driveshaft. Mechanical advantage is chosen such that the worm cannot be rotated by the spool flange gearing, preferably. The worm has as an integral part an inertia plate or flywheel 40 affixed above it as by a shank 42 concentric to both. A ratchet 44 fixed on the yoke limits retrorotation of the inertia plate by engaging teeth 45 on the inertia plate perimeter.

The filaments preferably enter respective openings 22c in the driveshaft below the spools and pass downward through respective shaft interior channels to the cutter head at the lower end, where they pass outward the free ends emerging as radial cutting-lengths 16a of filament.

OPERATION OF THE FIRST EMBODIMENT

When the filament cutter commences operation, the driveshaft-mounted yokd by means of the yoke-mounted ratchet prevents counter rotation of the inertia plate and worm pinion and causes them to rotate with the drive shaft, cutting head, yoke and spools as a unit.

This synchronism continues during uniform rotation of the drive. Mechanical advantage between the worm and gearing restricts filament from unspooling under tension.

Filament feeds when load or switching interrupt drive uniformity and the inertia plate and worm pinion over-run the driveshaft/yoke/spool, slipping the ratchet and screwing the spools around in the unwinding direction. The inertia plate is made with sufficient mass to drive the worm pinion in over-run when the free or cutting ends 16a of the filament strike obstacles such as stones or fence wire or heavy stalks, all filament wear producers or filament breakers, momentarily retarding shaft rotation. The ratio of motor power to design cutting length of the free ends, and to inertia of the inertia plate and system friction can be adjusted in the design by conventional known methods for closest proportioning of feed to predicted filament wear.

Additionally, or alternatively, the inertia plate can easily be built with sufficient moment relative to system friction and motor drag to over-run when the unit is merely switched on-and-off, providing an easy switch-on switch-off feed for the filament. In either event, centrifugal force will tension and keep straight the filament unspooled.

So by adjusting construction parameters by well-known methods to vary the ratio of flywheel effect to friction of driveshaft, ratchet, worm pinion, spool and motor, the unit can be made to feed an increment of filament for each on-off flick of the power switch by an operator. The increments can be made relatively small if desired, by increasing ratchet friction, for example, to restrict the number of inertia plate teeth over-run, so that a number of on-off impulses will be required for each desired increment of feed. The ratchet can be of the escapement type, if desired, for more positive limitation to a predetermined discrete unit of feed for each torsional impulse.

STRUCTURE, SECOND EMBODIMENT

Figure 2:
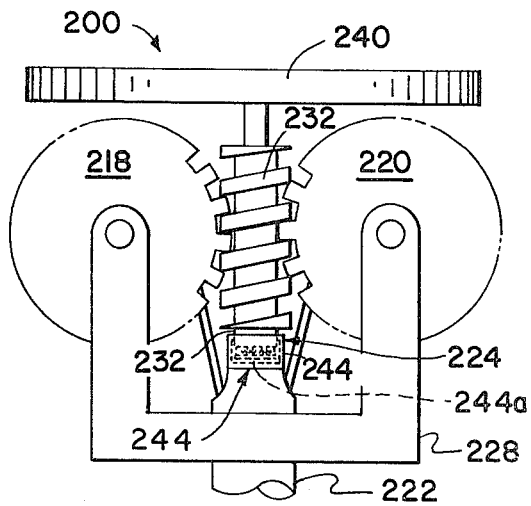
FIG. 2 is a view similar to that of FIG. 1 but of a detail of a second embodiment.

FIG. 2 illustrates details of a second embodiment 200 of the invention generally like the first embodiment except that as ratchet means a sprag overrunning clutch 244 substitutes for and serves the general function of the ratchet previously described. The inner part 244a of the clutch may mount to the worm pinion 232 and the outer part 244b to the shaft as shown, or vice versa. Mounting is conventional as by screwing, clamping or welding.

OPERATION, SECOND EMBODIMENT

In this embodiment the inertia plate 240 overruns as far as momentum and friction of the system and the relative rotational rates of the relevant parts permit, feeding out a proportional increment of filament.

STRUCTURE, THIRD EMBODIMENT

Figure 3:
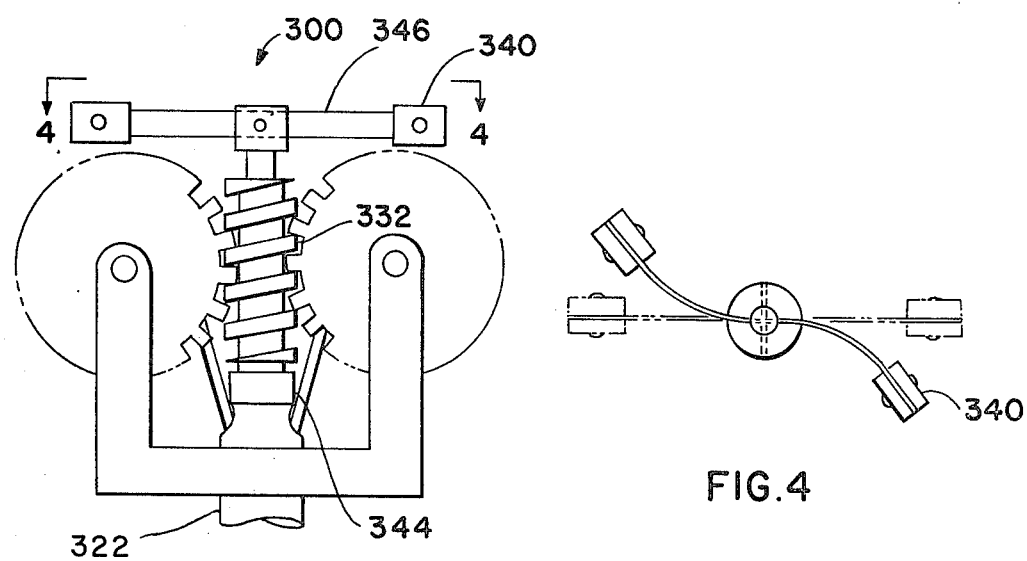
FIG. 3 is a view similar to that of FIG. 1 but of a detail of a third embodiment.

FIG. 3 illustrates at 300 details of a third embodiment of the invention, which embodiment is similar to the second embodiment but with means for torsional resonation upon excitation by cutting transients, to feed filament by overrun of a sprag clutch 344. (A ratchet or the like will also serve the purpose.)

The inertia plate of the previous embodiment is embodied here in a mass or inertia member 340 which has elastic connection with the worm 332 by a radially deployed spring 346 fixed as by riveting to the mass and the worm. Preferably for dynamic balance the mass is symmetrically disposed about the axis in two parts on the spring, as shown. The spring may be flat with major cross-section parallel with the driveshaft 322 to minimize unwanted modes of vibration.

OPERATION, THIRD EMBODIMENT

Figure 4:
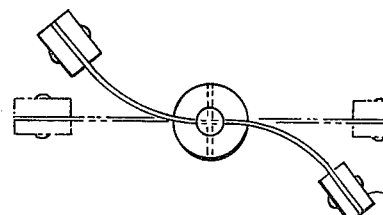
FIG. 4 is a view adapted from 4—4, FIG. 3.

FIG. 4 illustrates in plan view how the mass 340 oscillates when excited by a torsional acceleration caused by slowing and acceleration of the rotation rate of the driveshaft as result of load variation during cutting operations, or by switching the trimmer on and off one or more times as desired. It is to be understood that the invention is not limited to the type elastic element described, as other such elements may be employed such as a torsional spring concentrically mounted and connecting an inertial plate, even though the radially deployed spring obviously offers adjustment capabilities.

STRUCTURE, FOURTH EMBODIMENT

Figure 5:
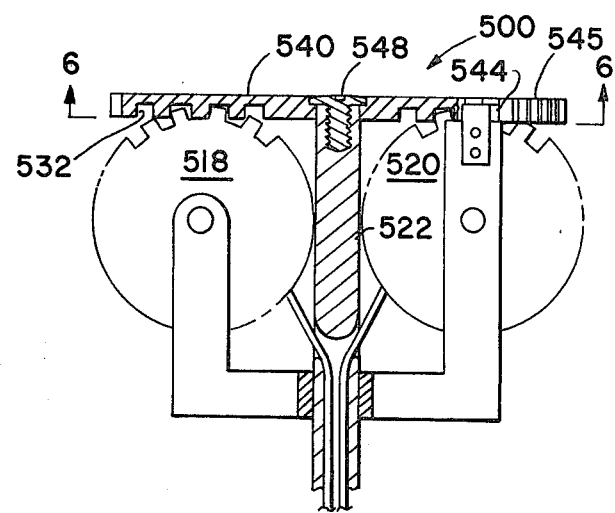
FIG. 5 is a view similar to that of FIG. 1 but of a detail of a fourth embodiment.

FIG. 5 illustrates details of a fourth embodiment 500 of the invention. This relates to the housing, motor and cutting head in generally the same manner as the first embodiment but the first gear forms the underface of the inertia plate in a single planar gear/inertia unit 540 having rotatable mounting 548 relative to and centrally on the upper end of the driveshaft 522, a gear tooth spiral 532, the underface engaging and synchronizing (preferably) plural spools 518 and 520. Ratchet teeth 545 on the perimeter are engaged by a yoke-mounted ratchet escapement 544 of conventional design.

Figure 6:
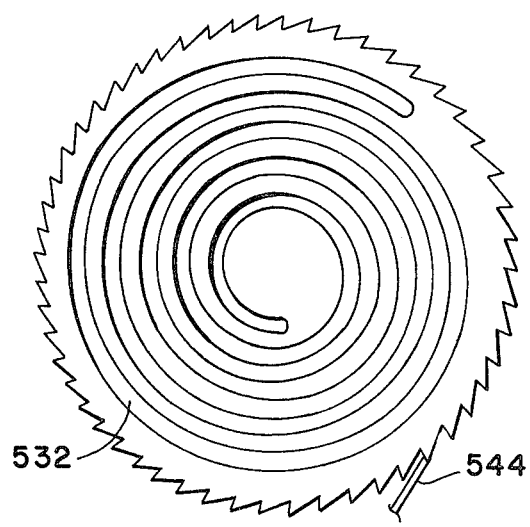
FIG. 6 is a view taken at 6—6, FIG. 5.

FIG. 6 shows the bottom plan view of the gear forming the lower surface of the inertia member or plate. Obviously the gear threads 532 can be plural interrupted threads or other conventional threads so long as the function is the same and the mechanical advantage prevents filament tension under centrifugal force from drawing filament from the supply.

OPERATION, FOURTH EMBODIMENT

As before, when the inertia member overruns, it turns the gear-flanged spools and feeds out an increment of filament. As with the first embodiment size of each increment may be fixed to a greater or lesser degree. If a simple ratchet is used and tightly applied to the teeth it will tend to keep the increments uniform except that it may feed more under severe torsional vibration caused by severe accelerative forces while cutting. As with other embodiments, a freely overrunning ratchet or clutch may be used, or not ratchet at all if the system friction and mass are proportional to prevent undue reverse winding, but the increments of filament feed will tend to be less controlled. Using switch on-off to feed line can result in more predictable feed, but may require use of coarser tooth-ration to produce desirably larger feed per operation.

In conclusion, it can be seen that this invention combines basic simplicity and ruggedness with finger-protecting safety and convenience in feeding filament in filament trimmers, all at little additional cost and with commercially proven type elements, some of which may be available off the shelf. Further, it will be appreciated that operation of the invention is positive regardless of the absolute rotation rate, unlike centrifugally operated devices, so that the invention can be used in both electric and gasoline embodiments, and in all size trimmers.

Finally, it will be noted that close tolerances are not required in the construction, and indeed that loose tolerances can be used to introduce torsional vibration, if desired, so that the invention can constantly feed minute increments suited to some cutting conditions.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In an incremental feed for filament in a filament trimmer which has a uniformly rotatable drive swinging an end of filament from a supply of filament as a cutting length, said drive subject to conditions during trimming causing non-uniform rotation thereof, and means for filament feed from the supply to the cutting length, the improvement comprising: the means for filament feed including: first and second gears having interconnection, the supply having association with the second gear for releasing filament from the supply upon a rotation of the second gear, the first gear having a mounting rotatable relative to the drive in a direction causing said rotation of the second gear, means for causing rotation of the first gear in said direction relative to the drive upon non-uniform rotation of the drive, including an inertia member having connection with the first gear for overrunning the drive; and means for restricting filament feed from the supply during uniform rotation of the drive, comprising said interconnection of the first and second gears having mechanical advantage preventing filament from drawing from the supply toward the cutting length and said means for restricting further including means for preventing rotation of the first gear counter to said direction relative to the drive upon non-uniform rotation of the drive.

2. In an incremental feed as recited in claim 1, said inertia member connection being an elastic connection.

3. In an incremental feed as recited in claim 2, the elastic connection including a spring radially deployed from the drive and holding the inertia member outwardly from the drive.

4. In an incremental feed as recited in claim 3, the inertia member being in two parts symmetrically disposed about the drive on the spring.

5. In an incremental feed as recited in claim 1, the inertia member comprising a circular plate coaxially mounted with respect to the first gear.

6. In an incremental feed as recited in claim 1, the first gear comprising a worm, said supply association with the second gear including a spool, and the second gear comprising a flange on the spool.

7. In an incremental feed as recited in claim 6, a yoke rotatably holding the spool and mounting the spool to the drive.

8. In an incremental feed as recited in claim 7, additionally, a second said spool mounted by the yoke, in balanced relation about said drive, and having a third gear as a flange thereon, the third gear engaging the first gear.

9. In an incremental feed as recited in claim 1, the first gear forming a surface of the inertia member.

10. In an incremental feed as recited in claim 1, a third gear, means having association with the third gear for releasing a further filament upon a rotation of the third gear, and the third gear having engagement with the first gear.

* * * * *